United States Patent [19]
Goto

[11] Patent Number: 5,768,304
[45] Date of Patent: Jun. 16, 1998

[54] LASER

[75] Inventor: Chiaki Goto, Kanagawa-ken, Japan

[73] Assignee: Fuji Photo Film Co., Ltd., Kanagawa, Japan

[21] Appl. No.: 818,005

[22] Filed: Mar. 14, 1997

[30] Foreign Application Priority Data

Mar. 21, 1996 [JP] Japan ................. 8-064912

[51] Int. Cl.⁶ ................................. H01S 3/08
[52] U.S. Cl. ........................... 372/98; 372/22
[58] Field of Search ............... 372/98, 19, 22, 372/27

[56] References Cited

U.S. PATENT DOCUMENTS

| | | | |
|---|---|---|---|
| 5,278,851 | 1/1994 | Goto | 372/98 |
| 5,502,738 | 3/1996 | Hyuga | 372/27 |
| 5,506,860 | 4/1996 | Hyuga et al. | 372/98 |
| 5,657,341 | 8/1997 | Hyuga | 372/98 |
| 5,671,240 | 9/1997 | Okaaki | 372/98 |

*Primary Examiner*—Leon Scott, Jr.
*Attorney, Agent, or Firm*—Sughrue, Mion, Zinn, Macpeak & Seas, PLLC

[57] ABSTRACT

A laser includes a laser medium, a light source for emitting light which pumps the laser medium, a pair of mirrors which are disposed on opposite sides of the laser medium and form a resonator, an etalon which is disposed in the resonator in order to make the oscillation mode of a laser beam a single longitudinal mode and a nonlinear optical crystal which is disposed in the resonator and converts the laser beam to a second harmonic. The effective thickness t of the etalon satisfies the condition that $2t(n_{SH}-n_{FM})/\lambda_{SH}$ is substantially an integer wherein $\lambda_{SH}$ represents the wavelength of the second harmonic, $n_{FM}$ represents the refractive index of the etalon for the fundamental wave and $n_{SH}$ represents the refractive index of the etalon for the second harmonic.

1 Claim, 2 Drawing Sheets

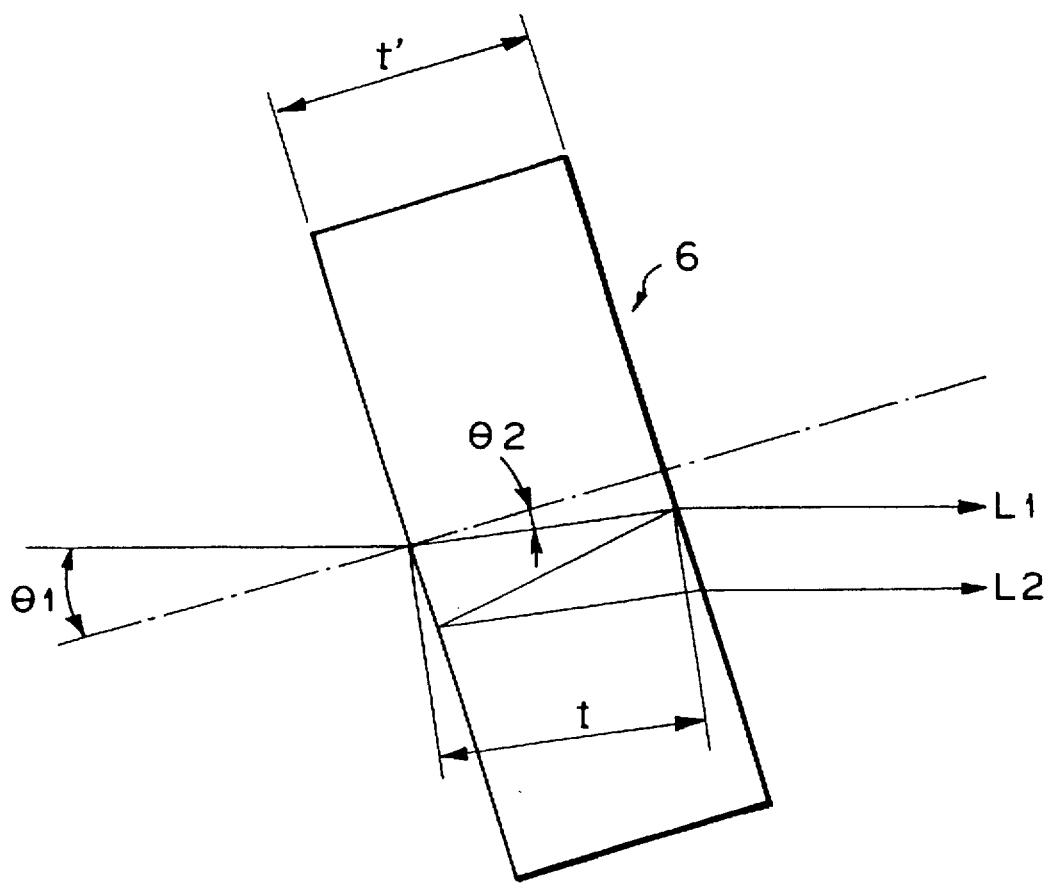

LASER

BACKGROUND OF THE INVENTION

1. Field of the Invention

This invention relates to a laser, and more particularly to a laser which is arranged to output in a single longitudinal mode by an etalon disposed in a resonator.

2. Description of the Related Art

There has been known a solid state laser in which a solid state laser medium doped with a rare earth metal such as neodymium is pumped with a laser beam emitted from a semiconductor laser (laser diode). In such a laser, it has been put into practice to dispose an etalon in the resonator in order to suppress generation of mode competition noise, thereby making the oscillation mode a single longitudinal mode.

Further, in such a laser, it has been in wide use to dispose a nonlinear optical crystal in the resonator in order to convert the laser beam to its second harmonic and to obtain a laser beam having a shorter wavelength.

However in a laser in which an etalon and a nonlinear optical crystal are disposed in the resonator, there has been a problem that a second harmonic reflected at an end face of the etalon appears around the main beam of a second harmonic, thereby deteriorating the beam quality of the second harmonic. The reason such a problem arises will be described in detail with reference to FIG. 3, hereinbelow.

In FIG. 3, reference numeral 1 denotes a pumping source, reference numeral 2 denotes a solid state laser medium pumped with pumping light 3 emitted from the pumping source 1, reference numeral 4 denotes a resonator mirror, reference numeral 5 denotes a nonlinear optical crystal and reference numeral 6 denotes an etalon. The resonator mirror 4 and the solid state laser medium 2 form a laser resonator. That is, a surface 4a of the resonator mirror 4 and an end face 2a of the laser medium 2 are provided with a predetermined coating and these faces function as resonator mirrors.

With this arrangement, the laser beam is converted to its second harmonic by the nonlinear optical crystal 5 and the second harmonic emanates from the resonator in the direction of the optical axis of the resonator mirror 4 as indicated at 7. The second harmonic 7 is the main beam.

The properties of the coating on the mirror surface 4a are determined on the basis of not only the second harmonic but also a fundamental wave so that the coating functions as a HR (high reflective) coating for the fundamental wave. Due to limitation on coating technique, the reflectance of the mirror surface 4a for the second harmonic is generally in the range of about 5 to 10%. That is, it is difficult to make the mirror surface 4a an antireflective surface (a surface whose reflectance is not higher than 0.5%).

Further since the etalon 6 is disposed generally at an angle not larger than 5° (preferably 0.3° to 1°) to the optical axis of the resonator, the second harmonic reflected at the mirror surface 4a is reflected at the etalon 6 at an angle to the main beam 7 and forms a stray beam 7' which emanates from the resonator around the main beam 7.

Further the stray beam 7' reflected at the rear end face of the etalon 6 (the end face of the etalon 6 facing the nonlinear optical crystal 5) is reflected again at the front end face of the etalon 6 and further reflected at the end face 2a of the laser medium 2 and emanates from the resonator at an angle to the main beam 7 as shown by the chained line. This forms another stray beam 7" which emanates from the resonator around the main beam 7.

Since the end face 2a of the laser medium 2 is provided with a HR coating in order to obtain a high second harmonic output, also the stray beam 7' is well reflected. Even if the end face 2a is provided with an AR coating for the second harmonic, it is difficult to lower the reflectance of the end face 2a to a level not higher than 0.5% for the reason described above in conjunction with the resonator mirror surface 4a.

Further since the etalon 6 is generally provided with coating on neither of the front and rear end faces for the purpose of simplicity, reflection is apt to take place at both the front and rear end faces. Even if an AR coating for the second harmonic is provided on each of the front and rear end faces of the etalon 6, the second harmonics reflected at the front and rear end faces interfere with and enhance each other since the front and rear end faces are plane parallel and the effective reflectance can sometimes reach about 2%.

SUMMARY OF THE INVENTION

In view of the foregoing observations and description, the primary object of the present invention is to prevent, in a laser comprising an etalon and nonlinear optical crystal disposed in a resonator, deterioration in beam quality of the main beam of second harmonic due to the inclusion of second harmonic reflected at the etalon.

The laser of the present invention comprises an etalon and a nonlinear optical crystal for generating a second harmonic disposed in a resonator and is characterized in that the effective thickness t of the etalon satisfies the condition that $2t(n_{SH}-n_{FM})/\lambda_{SH}$ is substantially an integer wherein $\lambda_{SH}$ represents the wavelength of the second harmonic, $n_{FM}$ represents the refractive index of the etalon for the fundamental wave and $n_{SH}$ represents the refractive index of the etalon for the second harmonic.

The present invention is based on the fact that a fundamental laser beam having a wavelength the effective transmittance of the etalon for which is increased due to interference between the fundamental wave reflected at the front and rear end faces of the etalon automatically comes to oscillate and on the fact that the wavelength of the second harmonic is strictly governed by the wavelength of the fundamental wave. That is, in accordance with the present invention, the thickness of the etalon is limited so that the transmittance of the etalon for the second harmonic is also increased (that is, the reflectance is lowered and the stray light is weakened) due to interference between the second harmonic reflected at the front and rear end faces of the etalon.

This will be described in more detail with reference to FIG. 2, hereinbelow. In FIG. 2, L1 and L2 denote fundamental waves or second harmonics which have an optical-path difference therebetween and interfere with each other due to reflection at the front and rear end faces of the etalon 6.

The laser beam as the fundamental wave oscillates at a wavelength at which loss due to interference at the etalon is minimized (the transmittance is maximized). This state can be formulated as follows since the optical-path difference between L1 and L2 is an integral multiple of the wavelength of the fundamental wave.

$$2tn_{FM}-2t\sin\theta 1 \cdot \sin\theta 2 = m_{FM}(\text{integer})\lambda_{FM} \quad (1)$$

wherein $n_{FM}$ represents the refractive index of the etalon for the fundamental wave, $\theta 1$ represents the inclination of the etalon (fundamental wave incident angle), $\theta 2$ represents the angle of the fundamental wave in the etalon, $\lambda_{FM}$ represents the wavelength of the fundamental wave and t represents the effective thickness of the etalon.

Further $\sin\theta_1 = n_{FM} \sin\theta_2$ and $t\cos\theta_2 = t'$, wherein t' represents the real thickness of the etalon.

Since the transmittance for the second harmonic is also increased due to interference at the etalon when the similar condition is satisfied, the following formula (2) can be obtained.

$$2m_{SH} \cdot 2t \sin\theta_1 \cdot \sin\theta_2 = m_{SH}(\text{integer})\lambda_{SH} \quad (2)$$

wherein $n_{SH}$ represents the refractive index of the etalon for the second harmonic, θ1 represents the inclination of the etalon (second harmonic incident angle), θ2 represents the angle of the second harmonic in the etalon and $\lambda_{SH}$ represents the wavelength of the second harmonic.

Since $\lambda_{FM} = 2\lambda_{SH}$, the left side of formula (2) becomes as follows.

$$2t(n_{SH} - n_{FM}) + (2m_{FM} - 2t \sin\lambda_1 \cdot \sin\theta_2)$$

$$= 2t(n_{SH} - n_{FM}) + m_{FM}(\text{integer})\lambda_{FM}$$

$$= 2t(n_{SH} - n_{FM}) + m_{FM}(\text{integer})2\lambda_{SH}$$

Accordingly when the first term of this formula is an integral multiple of $\theta_{SH}$, that is, when $$2t(n_{SH} - n_{FM}) = m'_{SH}(\text{integer})\lambda_{SH}$$

$$\therefore 2t(n_{SH} - n_{FM})/\lambda_{SH} = \text{an integer} \quad (3),$$

formula (2) should hold.

As described above, in the laser in accordance with the present invention, the effective thickness of the etalon is determined so that formula (3) should hold. Accordingly, the transmittance of the etalon is increased for the second harmonic as well as for the fundamental wave, whereby the stray light of second harmonic is reduced and the beam quality can be improved.

BRIEF DESCRIPTION OF THE DRAWINGS

FIG. 2 is a view for illustrating reflection of light beams at the front and rear end faces of the etalon.

DESCRIPTION OF THE PREFERRED EMBODIMENTS

Embodiment of the present invention will be described in detail with reference to the drawings, hereinbelow. In all the embodiments described hereinbelow, the present invention is applied to a laser diode pumped solid state laser. In all the embodiments, the arrangement of the elements in the laser diode pumped solid state laser is basically the same and is as shown in FIG. 1.

Figure 1:
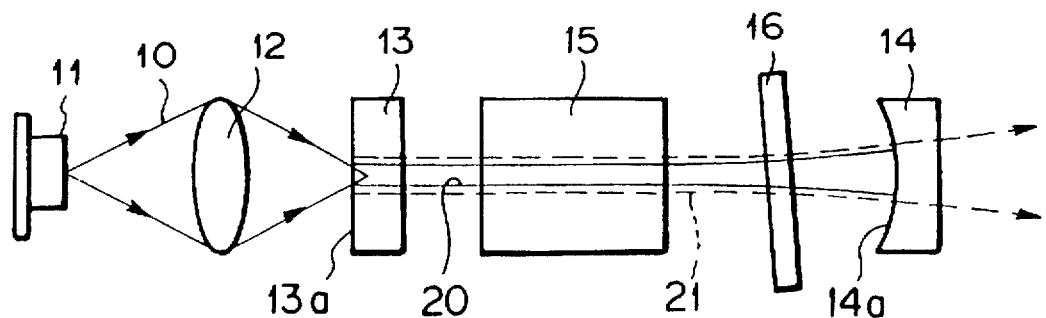
FIG. 1 is a schematic side view of a solid state laser in accordance with an embodiment of the present invention.
Figure 3:
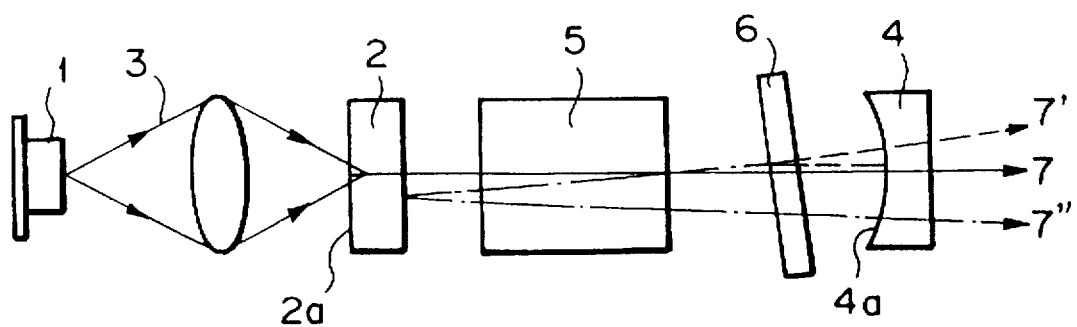
FIG. 3 is a schematic view for illustrating generation of stray light in the conventional lasers.

In FIG. 1, the laser diode pumped solid state laser comprises a semiconductor laser 11 which emits a laser beam 10 as a pumping beam, a condenser lens 12 which may be, for instance, a rod lens and condenses the laser beam 10 which is divergent light, a laser crystal doped with neodymium (Nd), a resonator mirror 14 disposed in front of the laser crystal 13 (on the right side of the laser crystal 13 as seen in FIG. 1), a nonlinear optical crystal 15 disposed between the laser crystal 13 and the resonator mirror 14, and an etalon 16 disposed between the nonlinear optical crystal 15 and the resonator mirror 14.

These elements are mounted on a common casing (not shown) into a unit. The temperature of the casing is kept at a predetermined temperature by a temperature sensor, a thermoelectric element and a temperature controller (which are not shown) so that the distances between the components and the refractive indexes of the optical elements are not changed.

In the laser with the arrangement described above, neodymium ions contained in the laser crystal 13 are excited by the laser beam 10 and emits light. The light resonates between the end faces 13a of the laser crystal 13 and the mirror surface 14a of the resonator mirror 14 and a solid laser beam 20 is produced. The solid laser beam 20 is converted to its second harmonic 21 having a wavelength equal to ½ of the solid laser beam 20 by the nonlinear optical crystal 15. The second harmonic 21 emanates forward from the resonator mirror 14. The oscillation mode of the laser is brought to a single longitudinal mode by the etalon 16, whereby a stabilized output free from mode competition noise can be obtained. The end face 13a of the laser crystal 13 is provided with coating which is highly reflective for the solid laser beam 20 and the second harmonic 21. The mirror surface 14a of the resonator mirror 14 is provided with coating which is highly reflective for the solid laser beam 20 and is partly transmissive for the second harmonic 21.

First Embodiment

Nd:YVO₄ crystal, that is, a YVO₄ crystal doped with neodymium (Nd) was employed as the laser crystal 13 and was pumped by a laser beam 10 of 808 nm, thereby generating a solid laser beam 20 having a wavelength of 1064 nm. A LiNbO₃ crystal having periodic domain reversals was employed as the nonlinear optical crystal 15 to convert the solid laser beam 20 (as the fundamental wave) to its second harmonic 21 having a wavelength ($\lambda_{SH}$) of 532 nm.

Synthetic quartz having plane parallel front and rear faces was employed as the etalon 16. The difference ($n_{SH} - n_{FM}$) between the refractive index $n_{SH}$ of the synthetic quartz etalon for the second harmonic (532 nm) and that $n_{FM}$ for the fundamental wave (1064 nm) was about 0.0111.

Since the half-width of the fluorescence spectra of 1064 nm oscillation line of the Nd:YVO₄ is about 0.8 nm, it is preferred that the FSR (Free Spectral range: longitudinal mode intervals) of the etalon 16 be not smaller than 0.8 nm in order to make the oscillation mode a single longitudinal mode. This condition corresponds to that the thickness of the synthetic quartz is not larger than 380 nm.

Taking into account also the requirement on the thickness of the etalon, 13 was adopted as the integer in formula (3), that is, $2t(n_{SH} - n_{FM})/\lambda_{SH} = 13$, which resulted in the effective thickness t of the etalon 16 of 312 μm (t=312 μm). The etalon 16 was inclined at an angle smaller than 1° to the optical axis of the resonator. In this particular embodiment, change in the optical path due to the inclination of the etalon was very small and the real thickness t' of the etalon 16 was made equal to the effective thickness thereof, that is, t'=t= 312 μm.

The etalon 16 was used without coating, reflection of the second harmonic 21 was weakened for the reason described above and no stray light due to the reflection was observed.

Then the etalon 16 was provided with coating whose reflectance for the second harmonic ($\lambda_{SH}$=532 nm) was not higher than 0.5%. The real reflectance was 0.2% and 0.5% respectively at the front and rear faces of the etalon 16. The etalon 16 was inserted into the resonator. Also in this case, reflection of the second harmonic 21 was weakened for the reason described above and only very weak stray light due to the reflection was observed.

Second Embodiment

Nd:YAG crystal, that is, a YAG crystal doped with neodymium (Nd) was employed as the laser crystal 13 and was pumped by a laser beam 10 of 809 nm, thereby generating a solid laser beam 20 having a wavelength of 946 nm. A LiNbO$_3$ crystal having periodic domain reversals was employed as the nonlinear optical crystal 15 to convert the solid laser beam 20 (as the fundamental wave) to its second harmonic 21 having a wavelength ($\lambda_{SH}$) of 473 nm.

Calcite having plane parallel front and rear faces was employed as the etalon 16. The difference ($n_{SH}-n_{FM}$) between the refractive index $n_{SH}$ (refractive index for light polarized in the direction of a-axis) of the calcite etalon for the second harmonic (473 nm) and that $n_{FM}$ for the fundamental wave (946 nm) was about 0.0252.

Taking into account the value of the difference ($n_{SH}-n_{FM}$), 35 was adopted as the integer in formula (3), that is, $2t(n_{SH}-n_{FM})/\lambda_{SH}=35$, which resulted in the effective thickness t of the etalon 16 of 328 μm (t=328 μm). The etalon 16 was inclined at an angle smaller than 1° to the optical axis of the resonator. In this particular embodiment, change in the optical path due to the inclination of the etalon was very small and the real thickness t' of the etalon 16 was made equal to the effective thickness thereof, that is, t'=t=328 μm.

The etalon 16 was provided with coating whose reflectance for the second harmonic ($\lambda_{SH}$=473 nm) was not higher than 0.5%. The real reflectance was 0.2% and 0.4% respectively at the front and rear faces of the etalon 16. The etalon 16 was inserted into the resonator. Also in this case, reflection of the second harmonic 21 was weakened for the reason described above and only very weak stray light due to the reflection was observed.

Third Embodiment

Nd:YLF crystal, that is, a YLF crystal doped with neodymium (Nd) was employed as the laser crystal 13 and was pumped by a laser beam 10 of 795 nm, thereby generating a solid laser beam 20 having a wavelength of 1313 nm. A LiNbO$_3$ crystal having periodic domain reversals was employed as the nonlinear optical crystal 15 to convert the solid laser beam 20 (as the fundamental wave) to its second harmonic 21 having a wavelength ($\lambda_{SH}$) of 657 nm.

Synthetic quartz having plane parallel front and rear faces was employed as the etalon 16. The difference ($n_{SH}-n_{FM}$) between the refractive index $n_{SH}$ of the synthetic quartz etalon for the second harmonic (657 nm) and that $n_{FM}$ for the fundamental wave (1313 nm) was about 0.0096.

Taking into account the value of the difference ($n_{SH}-n_{FM}$), 10 was adopted as the integer in formula (3), that is, $2t(n_{SH}-n_{FM})/\lambda_{SH}=10$, which resulted in the effective thickness t of the etalon 16 of 342 μm (t=342 μm). The etalon 16 was inclined at an angle smaller than 1° to the optical axis of the resonator. In this particular embodiment, change in the optical path due to the inclination of the etalon was very small and the real thickness t' of the etalon 16 was made equal to the effective thickness thereof, that is, t'=t=342 μm.

The etalon 16 was provided with coating whose reflectance for the second harmonic ($\lambda_{SH}$=657 nm) was not higher than 0.5%. The real reflectance was 0.4% and 0.5% respectively at the front and rear faces of the etalon 16. The etalon 16 was inserted into the resonator. Also in this case, reflection of the second harmonic 21 was weakened for the reason described above and only very weak stray light due to the reflection was observed.

Fourth Embodiment

Nd:YVO$_4$ crystal was employed as the laser crystal 13 and was pumped by a laser beam 10 of 808 nm, thereby generating a solid laser beam 20 having a wavelength of 1064 nm. A LiNbO$_3$ crystal having periodic domain reversals was employed as the nonlinear optical crystal 15 to convert the solid laser beam 20 (as the fundamental wave) to its second harmonic 21 having a wavelength ($\lambda_{SH}$) of 532 nm.

Synthetic quartz having plane parallel front and rear faces was employed as the etalon 16. The difference ($n_{SH}-n_{FM}$) between the refractive index $n_{SH}$ of the synthetic quartz etalon for the second harmonic (532 nm) and that $n_{FM}$ for the fundamental wave (1064 nm) was about 0.0111.

The etalon 16 was inclined at 1° to the optical axis of the resonator. In this case, since the refractive index $n_{SH}$ of the synthetic quartz etalon for the second harmonic (532 nm) is 1.4607, the ratio of the real thickness t' of the etalon 16 to the effective thickness t (t'/t) is 0.999927.

The thickness of the synthetic quartz etalon should be not larger than 380 nm in view of FSR of the etalon 16 as in the first embodiment.

Taking into account also the requirement on the thickness of the etalon, 14 was adopted as the integer in formula (3), that is, $2t(n_{SH}-n_{FM})/\lambda_{SH}=14$, which resulted in the effective thickness t of the etalon 16 of 335.50 um (t=335.50 μm). Theoretically the real thickness of the etalon 16 should have been 335.48 μm (335.50×0.999927). However an etalon 16 335 μm thick was used.

The etalon 16 was provided with coating whose reflectance for the second harmonic ($\lambda_{SH}$=532 nm) was not higher than 0.5%. The real reflectance was 0.2% and 0.5% respectively at the front and rear faces of the etalon 16. The etalon 16 was inserted into the resonator. Also in this case, reflection of the second harmonic 21 was weakened for the reason described above and only very weak stray light due to the reflection was observed.

Fifth Embodiment

Nd:YVO$_4$ crystal was employed as the laser crystal 13 and was pumped by a laser beam 10 of 808 nm, thereby generating a solid laser beam 20 having a wavelength of 1064 nm. A LiNbO$_3$ crystal having periodic domain reversals was employed as the nonlinear optical crystal 15 to convert the solid laser beam 20 (as the fundamental wave) to its second harmonic 21 having a wavelength ($\lambda_{SH}$) of 532 nm.

Synthetic quartz having plane parallel front and rear faces was employed as the etalon 16. The difference ($n_{SH}-n_{FM}$) between the refractive index $n_{SH}$ of the synthetic quartz etalon for the second harmonic (532 nm) and that $n_{FM}$ for the fundamental wave (1064 nm) was about 0.0111.

- The thickness of the synthetic quartz etalon should be not larger than 380 nm in view of FSR of the etalon 16 as in the first embodiment.

Taking into account also the requirement on the thickness of the etalon, 14 was adopted as the integer in formula (3), that is, $2t(n_{SH}-n_{FM})/\lambda_{SH}=14$, which resulted in the effective thickness t of the etalon 16 of 335 μm (t=335 μm). The etalon 16 was inclined at an angle smaller than 1° to the optical axis of the resonator. In this particular embodiment, change in the optical path due to the inclination of the etalon was very small and the real thickness t' of the etalon 16 might be equal to the effective thickness thereof, that is, t'=t=335 μm. However an etalon 16 which was 339 μm in thickness was used. That is, t'=t=339 μm.

In this case, the value of $2t(n_{SH}-n_{FM})/\lambda_{SH}=14.15$ and was slightly deviated from the optimal condition.

The etalon 16 was used without coating. Reflection of the second harmonic 21 was weakened for the reason described above and stray light due to the reflection was very weak though the effective thickness of the etalon 16 was slightly deviated from the optimal condition.

Sixth Embodiment Nd:YVO4 crystal was employed as the laser crystal 13 and was pumped by a laser beam 10 of 808 nm, thereby generating a solid laser beam 20 having a wavelength of 1064 nm. A LiNbO$_3$ crystal having periodic domain reversals was employed as the nonlinear optical crystal 15 to convert the solid laser beam 20 (as the fundamental wave) to its second harmonic 21 having a wavelength ($\lambda_{SH}$) of 532 nm.

Synthetic quartz having plane parallel front and rear faces was employed as the etalon 16. The difference ($n_{SH}-n_{FM}$) between the refractive index $n_{SH}$ of the synthetic quartz etalon for the second harmonic (532 nm) and that $n_{FM}$ for the fundamental wave (1064 nm) was about 0.0111.

The thickness of the synthetic quartz etalon should be not larger than 380 nm in view of FSR of the etalon 16 as in the first embodiment.

Taking into account also the requirement on the thickness of the etalon, 14 was adopted as the integer in formula (3), that is, $2t_{(SH}-n_{FM})/\lambda_{SH}=14$, which resulted in the effective thickness t of the etalon 16 of 335 µm (t=335 µm). The etalon 16 was inclined at an angle smaller than 1° to the optical axis of the resonator. In this particular embodiment, change in the optical path due to the inclination of the etalon was very small and the real thickness t' of the etalon 16 might be equal to the effective thickness thereof, that is, t'=t=335 µm. However an etalon 16 which was 337 µm in thickness was used. That is, t'=t=337 µm.

In this case, the value of $2t(n_{SH}-n_{FM})/\lambda_{SH}=14.06$ and was slightly deviated from the optimal condition.

The etalon 16 was provided with coating whose reflectance for the second harmonic ($\lambda_{SH}$=532 nm) was not higher than 0.5%. The real reflectance was 0.1% and 0.5% respectively at the front and rear faces of the etalon 16.

Also in this case, reflection of the second harmonic 21 was weakened for the reason described above and stray light due to the reflection was very weak though the effective thickness of the etalon 16 was slightly deviated from the optimal condition. The second harmonic 21 emanating from the resonator mirror 14 was practical in beam quality.

The present invention can also be applied to various solid state lasers other than those described above.

What is claimed is:

1. A laser comprising a laser medium, a light source for emitting light which pumps the laser medium, a pair of mirrors which are disposed on opposite sides of the laser medium and form a resonator, an etalon which is disposed in the resonator in order to make the oscillation mode of a laser beam a single longitudinal mode and a nonlinear optical crystal which is disposed in the resonator and converts the laser beam to a second harmonic, wherein the improvement comprises that the effective thickness t of the etalon satisfies the condition that $2t(n_{SH}-n_{FM})/\lambda_{FM}$ is substantially an integer wherein $\lambda_{SH}$ represents the wavelength of the second harmonic, $n_{FM}$ represents the refractive index of the etalon for the fundamental wave and $n_{SH}$ represents the refractive index of the etalon for the second harmonic.

* * * * *